United States Patent
Chan et al.

(10) Patent No.: US 10,373,500 B1
(45) Date of Patent: Aug. 6, 2019

(54) TECHNOLOGY FOR USING IMAGE DATA TO ASSESS VEHICULAR RISKS AND COMMUNICATE NOTIFICATIONS

(71) Applicant: STATE FARM MUTUAL AUTOMOBILE INSURANCE COMPANY, Bloomington, IL (US)

(72) Inventors: Aaron Scott Chan, Champaign, IL (US); Kenneth J. Sanchez, San Francisco, CA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 15/713,227

(22) Filed: Sep. 22, 2017

(51) Int. Cl.
*G08G 1/16* (2006.01)
*G06K 9/00* (2006.01)
*G08G 1/0965* (2006.01)

(52) U.S. Cl.
CPC ......... *G08G 1/163* (2013.01); *G06K 9/00845* (2013.01); *G08G 1/0965* (2013.01)

(58) Field of Classification Search
CPC ... G08G 1/163; G08G 1/0965; G06K 9/00845
USPC ........................................................ 340/902
See application file for complete search history.

(56) References Cited

U.S. PATENT DOCUMENTS

| | | | | |
|---|---|---|---|---|
| 7,545,261 B1* | 6/2009 | Harrington | ............ | G08G 1/163 340/435 |
| 2008/0004806 A1* | 1/2008 | Kimura | ................. | B60W 40/02 701/301 |
| 2014/0278586 A1* | 9/2014 | Sanchez | ................. | G06Q 40/00 705/4 |
| 2015/0232073 A1* | 8/2015 | Fujishiro | ................. | B60T 7/22 701/70 |
| 2016/0005315 A1* | 1/2016 | Cudak | ................... | G08G 1/162 340/435 |
| 2016/0101784 A1* | 4/2016 | Olson | ................... | B60K 35/00 340/576 |
| 2017/0072850 A1* | 3/2017 | Curtis | ............... | B60W 50/0097 |
| 2017/0325732 A1* | 11/2017 | Kodama | .................. | B60Q 1/26 |
| 2018/0086264 A1* | 3/2018 | Pedersen | ................ | B60Q 9/008 |
| 2018/0126901 A1* | 5/2018 | Levkova | .................. | B60Q 9/00 |
| 2018/0126985 A1* | 5/2018 | Lee | ........................ | G05D 1/0088 |
| 2018/0156624 A1* | 6/2018 | Bai | ........................ | G01C 21/36 |
| 2019/0035280 A1* | 1/2019 | Kim | ....................... | G08G 1/167 |

* cited by examiner

*Primary Examiner* — Hirdepal Singh
(74) *Attorney, Agent, or Firm* — Marshall, Gerstein & Borun LLP; Randall G. Rueth

(57) ABSTRACT

Systems and methods for generating and communicating notifications indicating risks associated with vehicular operation are provided. According to certain aspects, an electronic device may access and analyze image data that depicts a vehicle operator in a certain state. The electronic device may determine, based on the state of the vehicle operator, whether a risk exists as well as information that may be helpful to communicate to additional vehicle operators. The electronic device may generate a notification that indicates the information and transmit the notification to at least one additional vehicle and/or to an infrastructure component.

18 Claims, 6 Drawing Sheets

TECHNOLOGY FOR USING IMAGE DATA TO ASSESS VEHICULAR RISKS AND COMMUNICATE NOTIFICATIONS

TECHNICAL FIELD

The present disclosure is directed to facilitating the communication of notifications associated with vehicle operation. More particularly, the present disclosure is directed to systems and methods for analyzing image data to assess vehicular risks, and generating and transmitting notifications aimed to mitigate the vehicular risks.

BACKGROUND

Individuals have been operating and traveling in vehicles as a means of transportation for decades. With the increasing prevalence of electronic devices and sensors, there are more available components to generate data associated with vehicle operation. For example, vehicle sensors can measure or detect vehicle location, acceleration, general movement, and other information. There are existing applications that use this data to facilitate certain functionalities. For example, vehicle operators are able to share their velocity with other vehicle operators so that the other operators may gauge certain traffic conditions.

However, there are no existing solutions for effectively and efficiently using image data to reduce or eliminate certain driving risks. Accordingly, there is an opportunity for systems and methods to leverage image data to identify, and reduce or eliminate certain driving risks.

SUMMARY

A computer-implemented method in an electronic device of managing notifications associated with vehicular transportation is provided. The method may include accessing image data from at least one image sensor located within a vehicle being operated by a vehicle operator, analyzing, by a computer processor, the image data to determine a state of the vehicle operator as depicted in the image data, determining, based on the state of the vehicle operator, that a risk exists, identifying at least one component to which to transmit a notification that indicates the risk, generating the notification that indicates the risk, and transmitting, via a network connection, the notification to the at least one component.

In another embodiment, a system for managing notifications associated with vehicular transportation is provided. The system may include a transceiver configured to communicate via a network connection, a memory configured to store non-transitory computer executable instructions, and a processor configured to interface with the memory. The processor may be configured to execute the non-transitory computer executable instructions to cause the processor to access image data from at least one image sensor located within a vehicle being operated by a vehicle operator, analyze the image data to determine a state of the vehicle operator as depicted in the image data, determine, based on the state of the vehicle operator, that a risk exists, identify at least one component to which to transmit a notification that indicates the risk, generate the notification that indicates the risk, and transmit, via the transceiver, the notification to the at least one component.

DETAILED DESCRIPTION

Figure 1A:
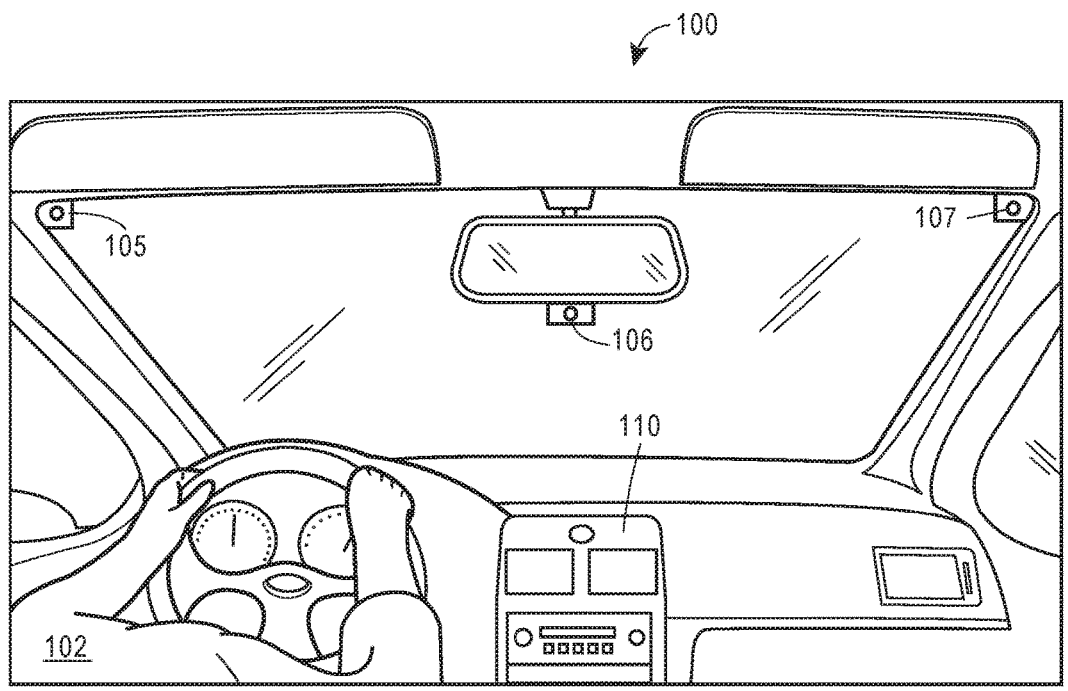
FIGS. 1A and 1B depict example environments within a vehicle including various components configured to facilitate various functionalities, in accordance with some embodiments.

The present embodiments may relate to, inter alia, generating and transmitting notifications of detected risks associated with vehicle operation. According to certain aspects, systems and methods may access image data that depicts vehicle operators, and may analyze the image data to identify the vehicle operators as well as a current state of the vehicle operators, such as a physical position of the vehicle operators or a movement made by the vehicle operators. Based on the current state of the vehicle operators, the systems and methods may determine whether a vehicular risk is posed to the vehicle operator, to another vehicle and/or operator thereof, and/or to another individual (e.g., a pedestrian).

In embodiments, a given vehicle (or an electronic device associated therewith) may connect to other vehicles via one or more network connections, and/or may connect to infrastructure components via a vehicle-to-infrastructure (V2I) network. The systems and methods may generate a notification that indicates the determined vehicular risk, and may transmit the notification to the other vehicles and/or to the infrastructure components. The other vehicles may present the notification to operators thereof so that the operators may assess the risk and adjust vehicle operation accordingly. If the infrastructure components receive the notification, the infrastructure components may display the notification for other vehicle operators to assess, and/or may transmit the notification to other vehicles so that the operators of the other vehicles may assess the risk and adjust vehicle operation accordingly.

The systems and methods therefore offer numerous benefits. In particular, the systems and methods effectively and efficiently determine vehicular risks based on collected and analyzed image data. Further, through the systems and methods communicating notifications of the vehicle risks to other vehicles or infrastructure components, operators of the other vehicles may become aware of the risks and may adjust operation accordingly. Thus, occurrences of accidents and collisions may be reduced. It should be appreciated that other benefits are envisioned.

The systems and methods discussed herein address a challenge that is particular to vehicle operation. In particular, the challenge relates to a difficulty in communicating relevant information between and among vehicle operators.

Using conventional technologies, vehicle operators view limited telematics data of other vehicles, such as velocity and location. However, the risks that may be inferred from the limited telematics data are limited. The systems and methods offer improved capabilities to solve these problems by accessing and analyzing image data to determine the current state of vehicle operators, identifying vehicular risks based on the determined current state, and generating and communicating notifications indicating the identified risks. Accordingly, vehicle operators may review the notifications to be informed of the identified risks. Further, because the systems and methods employ the collection, analysis, and transmission of data associated with vehicles, the systems and methods are necessarily rooted in computer technology in order to overcome the noted shortcomings that specifically arise in the realm of vehicle operation.

Similarly, the systems and methods provide improvements in a technical field, namely, vehicle data compiling. Instead of the systems and methods merely being performed by hardware components using basic functions, the systems and methods employ complex steps that go beyond the mere concept of simply retrieving and combining data using a computer. In particular, the hardware components capture image data, analyze the image data to determine vehicle operator states, collect telematics data, generate notifications, and transmit the notifications to various components and devices via one or more network connections, among other functionalities.

According to implementations, the systems and methods may support a dynamic, real-time or near-real-time analysis of any captured, received, and/or detected data. In particular, the electronic device may receive or capture image data in real-time or near real-time, and may automatically and dynamically analyze the captured image data. The electronic device may also receive or detect certain vehicle operation parameters in real-time or near-real-time, and may automatically and dynamically generate and communicate relevant notifications. In this regard, any individual who receives a notification is afforded the benefit of accurate and relevant data.

FIG. 1A illustrates an example depiction of an interior of a vehicle 100 that may include various components associated with the systems and methods. In some scenarios, an individual 102 may operate (i.e., drive) the vehicle 100. Although the individual 102 is depicted as sitting in the driver's seat of the vehicle 100 and operating the vehicle 100, it should be appreciated that the individual 102 may be a passenger of the vehicle, and may sit in a front passenger seat or any of a set of rear passenger seats. In scenarios in which the individual 102 is a passenger of the vehicle 100, another individual may operate the vehicle 100.

As depicted in FIG. 1A, the interior of the vehicle 100 may support a set of image sensors 105, 106, 107. In the particular scenario depicted in FIG. 1A, each of the image sensors 105, 107 is located near a top corner of the interior of the vehicle 100, and the image sensor 106 is located below a rear view mirror. Although three (3) image sensors are depicted in FIG. 1A, it should be appreciated that additional or fewer image sensors are envisioned. Further, it should be appreciated that the image sensors 105, 106, 107 may be disposed or located at various alternate or additional portions of the vehicle 100, including on an exterior of the vehicle 100.

Each of the image sensors 105, 106, 107 may be configured to detect and convey information that constitutes an image. In particular, each of the image sensors 105, 106, 107 may generate digital image data according to the detected information, where the digital image data may be in the form of image data and/or video data. Although not depicted in FIG. 1A, the vehicle 100 may also include one or more microphones that may be disposed in one or more locations, where the microphones may be configured to capture audio data that may supplement the digital image data captured by the image sensors 105, 106, 107.

The vehicle 100 may also be configured with an electronic device 110 configured with any combination of software and hardware components. In some implementations, the electronic device 110 may be included as part of an on-board diagnostic (OBD) system or any other type of system configured to be installed in the vehicle 100, such as an original equipment manufacturer (OEM) system. The electronic device 110 may include a set of sensors configured to detect and record various telematics data associated with the vehicle 100. In some implementations, the electronic device 110 may be configured to communicate with (i.e., request, retrieve, or receive data from) a set of sensors disposed in other locations of the vehicle 100, such as each of the image sensors 105, 106, 107. Further, in some implementations, the electronic device 110 itself may be equipped with one or more image sensors.

According to embodiments, the set of sensors included in the electronic device 110 or otherwise configured to communicate with the electronic device 110 may be of various types. For example, the set of sensors may include a location module (e.g., a global positioning system (GPS) chip), an accelerometer, an ignition sensor, a clock, speedometer, a torque sensor, a throttle position sensor, and/or other sensors.

Figure 1B:
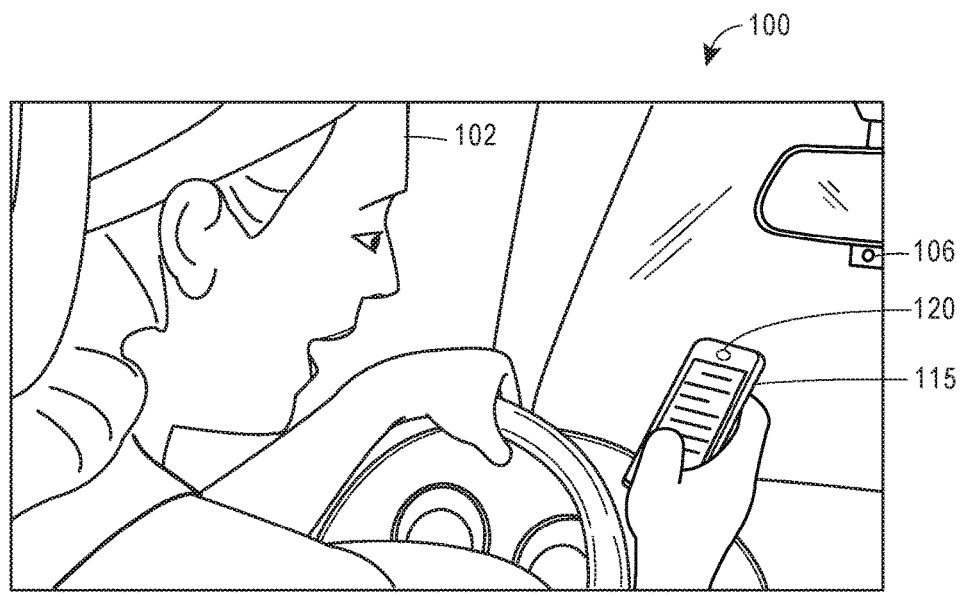

FIG. 1B depicts another configuration of an interior of the vehicle 100 that may include various components associated with the systems and methods. Similar to the depiction of FIG. 1A, the depiction of FIG. 1B illustrates the individual 102 who may be an operator or passenger of the vehicle. The individual 102 may access and interface with an electronic device 115 that may be located within the vehicle 100. Although FIG. 1B depicts the individual 102 holding the electronic device 115, it should be appreciated that the electronic device 115 may be located within the vehicle 100 without the individual 102 contacting the electronic device 115. For example, the electronic device 115 may be secured within a mount.

According to embodiments, the electronic device 115 may be any type of electronic device such as a mobile device (e.g., a smartphone). It should be appreciated that other types of electronic devices and/or mobile devices are envisioned, such as notebook computers, tablets, phablets, GPS (Global Positioning System) or GPS-enabled devices, smart watches, smart glasses, smart bracelets, wearable electronics, PDAs (personal digital assistants), pagers, computing devices configured for wireless communication, and/or the like. The electronic device 115 may be configured with at least one image sensor 120 configured to capture digital image data, as discussed herein. The electronic device 115 may further include additional sensors, such as a clock, accelerometer, location module (e.g., GPS chip), gyroscope, and/or other types of sensors.

In some implementations, the electronic device 115 may be configured to interface with additional components of the vehicle 100. In particular, the electronic device 115 may interface with the electronic device 110 and sensors thereof, any of the image sensors 105, 106, 107, and/or other components of the vehicle 100, such as any additional sensors that may be disposed within the vehicle 100. Further, although not depicted in FIG. 1A or 1B, the vehicle 100 and/or each of the electronic devices 110, 115 may be equipped with storage or memory capable of storing various data.

In operation, either of the electronic devices 110, 115 may be configured to receive or otherwise access image data captured by any combination of the image sensors 105, 106, 107, 120. The electronic devices 110, 115 may access user profile data that may be stored in the storage or memory, and may compare the received image data to the user profile data to identify the individual 102 who may be depicted in the image data. Additionally or alternatively, the electronic devices 110, 115 may analyze the image data to detect any movements made by the individual 102 that may be depicted in the image data, as well as determine or ascertain a state of the individual 102. Further, the electronic devices 110, 115 may further interface with the various sensors or other components to assess real-time environmental parameters associated with operation of the vehicle 100 (e.g., speed, location, route information, current time, current date).

Figure 1C:
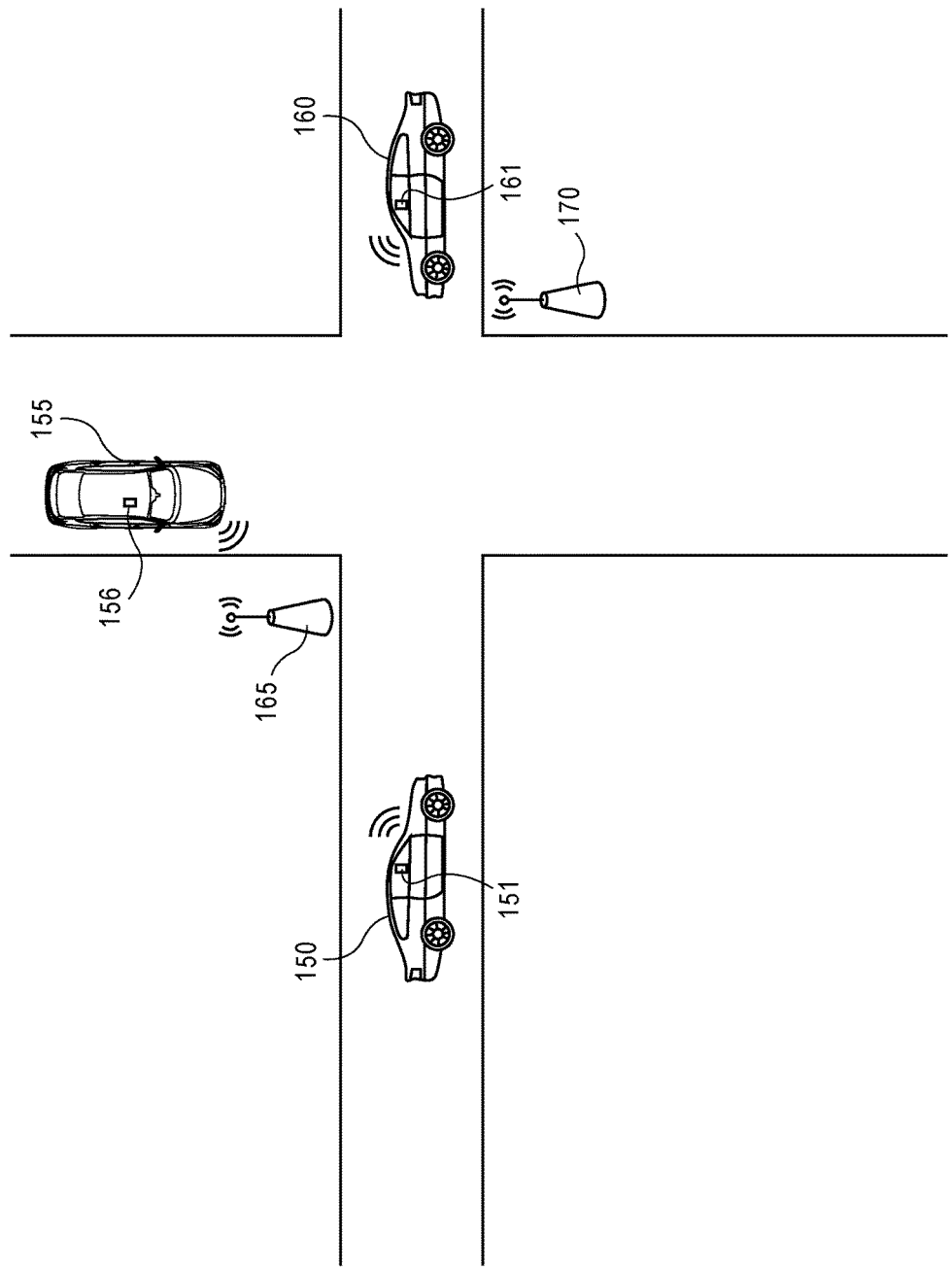
FIG. 1C depicts an example environment including vehicles and infrastructure components, in accordance with embodiments.

FIG. 1C depicts an example environment 175 associated with the systems and methods. The environment 175 may include a set of vehicles 150, 155, 160 and a set of infrastructure components 165, 170. Each of the set of vehicles 150, 155, 160 may be configured with at least one electronic device 151, 156, 161, such as either of the electronic devices 115, 110 as discussed with respect to FIGS. 1A and 1B, or another electronic device associated with the set of vehicles 150, 155, 160.

Each of the infrastructure components 165, 170 may be any combination of physical hardware and software components. Generally, the infrastructure components 165, 170 may be disposed or installed near where the set of vehicles 150, 155, 160 operate (e.g., along a roadway). Further, the set of infrastructure components 165, 170 may be configured with a display component (e.g., a display screen) configured to display any textual and/or visual content.

The set of electronic devices 151, 156, 161 may be configured to communicate with each other, thus effectively forming a mesh network. This communication is generally referred to as vehicle-to-vehicle (V2V) communication, and may occur regardless of whether the respective vehicles 150, 155, 160 are in operation. It should be appreciated that the V2V communication may be facilitated using one or more dedicated short-range communications (DSRC), or via any other standard, network, technology, or the like. For example, the set of electronic devices 151, 156, 161 may communicate with each other via the 5.9 GHz band.

Similarly, the set of electronic devices 151, 156, 161 may be configured to communicate with the infrastructure components 165, 170, a type of communication that is generally referred to as vehicle-to-infrastructure (V2I) communication. It should be appreciated that the V2I communication may also be facilitated using one or more DSRCs, or via any other standard, network, technology, or the like. For example, the set of electronic devices 151, 156, 161 may communicate with the infrastructure components 165, 170 via the 5.9 GHz band.

In operation, the set of electronic devices 151, 156, 161 may collect image data depicting individuals (e.g., vehicle operators) traveling in the set of vehicles 150, 155, 160, as well as certain telematics data associated with operation of the set of vehicles 150, 155, 160, including speed, position, heading, acceleration, size, brake status, and/or other data. The set of electronic devices 151, 156, 161 may analyze the collected data to determine a state of the vehicle operators and assess any risks associated with the operation of one or more of the vehicles 150, 155, 160. Additionally, the set of electronic devices 151, 156, 161 may generate notifications and transmit notifications to any of the other electronic devices 151, 156, 161, and/or to the infrastructure components 165, 170. In an implementation, the infrastructure components 165, 170 may display, via display components, the notifications, or may transmit the notifications to any of the other electronic devices 151, 156, 161. Individuals having access to the electronic devices 151, 156, 161 and/or within view of the infrastructure components 165, 107 may review the notifications and take appropriate action. These functionalities are further described with respect to FIG. 2.

Figure 2:
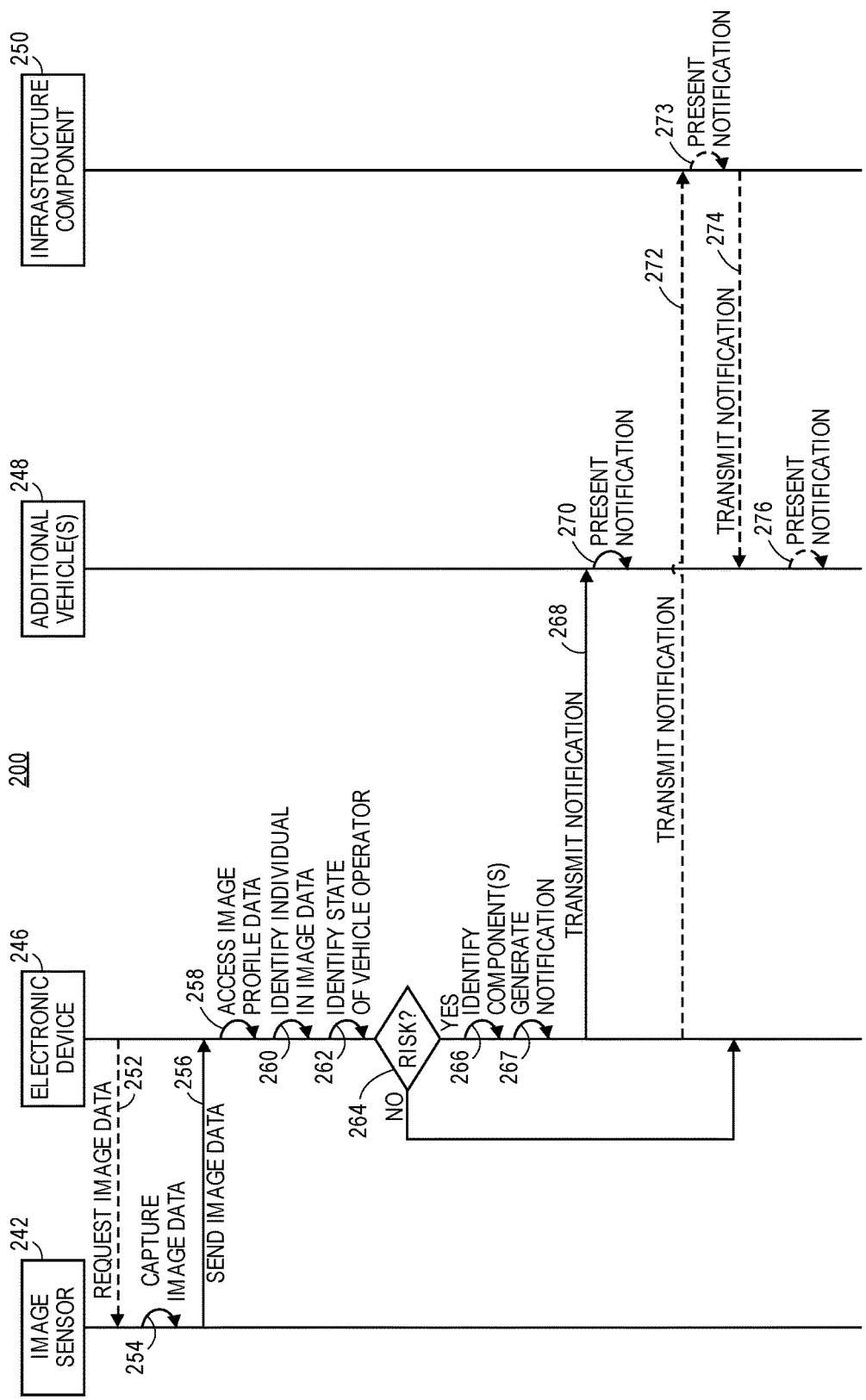
FIG. 2 depicts an exemplary signal diagram associated with analyzing image data, assessing risks, and facilitating the communication of notifications, in accordance with some embodiments.

FIG. 2 depicts a signal diagram 200 associated with facilitating certain functionalities associated with the systems and methods. The signal diagram 200 includes an image sensor 242 (such as one of the image sensors 105, 106, 107, 120 as discussed with respect to FIGS. 1A and 1B), an electronic device 246 (such as one of the electronic devices 110, 115 as discussed with respect to FIGS. 1A and 1B), at least one additional vehicle 248, and at least one infrastructure component 250. According to embodiments, the electronic device 246 may be located within a vehicle. It should be appreciated that additional or alternative components and devices are envisioned.

The signal diagram 200 may begin when the electronic device 246 optionally requests (252) image data from the image sensor 242. According to embodiments, the electronic device 246 may automatically request the image data periodically (e.g., once every ten seconds, once every minute, once every hour), or a user of the electronic device 246 may cause the electronic device 246 to request the image data. Further, the request may include a specified amount of image data and/or a specific time component (e.g., real-time image(s), real-time video, image(s) and/or video recorded five minutes ago). It should be appreciated that the image sensor 242 may be internal to or external from the electronic device 246.

The image sensor 242 may capture (254) image data and send (256) the image data to the electronic device 246. In one implementation, the image sensor 242 may automatically send the image data to the electronic device 246 in real-time or near real-time as the image sensor 242 captures the image data, and/or in response to a request from the electronic device 246. In another implementation, the image sensor 242 may send previously-captured image data to the electronic device 246, such as if the image sensor 242 interfaces with some type of memory or storage. It should be appreciated that the image data may depict a vehicle operator or a passenger of the vehicle.

The electronic device 246 may access (258) image profile data associated with one or more individuals. In embodiments, the one or more individuals may be registered or otherwise associated with the vehicle (e.g., one or more registered drivers of the vehicle). The electronic device 246 may access the image profile data from local memory or from remote storage via a network connection. According to embodiments, the image profile data may include a set of attributes, characteristics, and/or the like that may be related to the one or more individuals. For example, the image profile data may include facial recognition data related to relative positions, sizes, and/or shapes of the eyes, noses, cheekbones, jaws, and/or other features of the one or more individuals.

The electronic device 246 may identify (260) an individual depicted in the image data based on an analysis of the received image data and the accessed image profile data. According to the embodiments, the individual depicted in the image data may be the vehicle operator or a passenger of the vehicle. In one implementation, the electronic device 246 may perform a facial recognition algorithm or technique using the received image data to determine that the facial features of an individual depicted in the received image data matches those corresponding to an individual included in the image profile data. It should be appreciated that other types of calculations, algorithms, comparisons, or techniques are envisioned.

The electronic device 246 may also identify (262) a state of the vehicle operator. In particular, the electronic device 246 may access, from local memory or from an external source (e.g., a remote server), a set of baseline image data that may depict general movements, gestures, and the like. The electronic device 246 may analyze the captured image data in combination with the set of baseline image data to determine any movements, gestures, or the like that may be depicted in the captured image data (i.e., any movements, gestures, or the like that the vehicle operator may make). Based on the determined movement(s), gesture(s), or the like, the electronic device 246 may determine or identify a state of the vehicle operator, where the state of the vehicle operator may correspond to an emotional state, a physical state, or the like. The electronic device 246 may determine or identify the state of the vehicle operator according to various calculations, techniques, or the like.

Generally, the electronic device 246 may match any determined movement(s), gesture(s), or the like to those that may be associated with a given state. For example, if the image data depicts the vehicle operator hit the steering wheel and shout, the electronic device 246 may determine that the vehicle operator is frustrated. For further example, if the image data depicts the vehicle operator's head consistently nodding, the electronic device 246 may determine that the vehicle operator is tired or fatigued.

The electronic device 246 may determine (264) whether the state of the vehicle operator poses a risk. According to embodiments, the risk may be posed to any or all of: the vehicle operator, the vehicle, the additional vehicle(s) 248, operator(s) of the additional vehicle(s) 248, one or more pedestrians, or any other physical item located within a vicinity or projected vicinity of the vehicle. In performing the determination, the electronic device 246 may determine or identify one or more risks that may be associated with the state of the vehicle operator (e.g., by accessing a lookup table or other type of data structure). For example, if the state of the vehicle operator is that the vehicle operator is severely distracted (e.g., is texting while driving), the electronic device 246 may determine that the vehicle operator is at risk of causing an accident that may affect one or more vehicles, operators, passengers, pedestrians, and/or other objects.

Additionally, in performing the determination, the electronic device 246 may determine or estimate a future movement that may be undertaken by the vehicle. In particular, the electronic device 246 may retrieve or access certain telematics data (e.g., location, velocity, heading, etc.) and estimate, based on the telematics data, an estimated future path or movement of the vehicle. The electronic device 246 may determine the risk based on the future movement as well as the state of the vehicle operator.

In embodiments, a given pairing between a state of the vehicle operator and an associated risk have may a percentage likelihood of an event occurring. Further, the electronic device 246 may deem that a risk is posed, or that individual should be notified of the risk, when the percentage likelihood of occurring meets or exceeds a threshold value. For example, if the state of a vehicle operator indicates that the vehicle operator is looking out the side window and is therefore distracted, the act of looking out the side window has an associated 20% likelihood of an event (e.g., an accident) occurring, and the threshold percentage is 15%, then the electronic device 246 may deem that the risk is posed. Generally, it should be appreciated that the electronic device 246 may ascertain risks and determine if the risks are posed using various calculations, techniques, algorithms, and/or the like.

If the electronic device 246 determines that the state of the vehicle operator does not pose a risk ("NO"), processing may end or proceed to other functionality (e.g., processing may repeat). If the electronic device 246 determines that the state of the vehicle operator does pose a risk ("YES"), the electronic device 246 may also identify (266) at least one component to which to transmit a notification that indicates the risk. In embodiments, the at least one component may be the additional vehicle(s) 248 and/or the infrastructure component 250, and the electronic device 246 may account for various data and parameters when identifying the at least one component. In one implementation, the electronic device 246 may identify a location of the vehicle (e.g., using a location module such as a GPS module), and may identify the at least one component based on the location of the vehicle. For example, the electronic device 246 may identify at least one additional vehicle that is traveling in a vicinity of the vehicle, or may identify an infrastructure component past which the vehicle is predicted to travel.

Further, in an implementation, the electronic device 246 may retrieve or access a set of telematics data associated with operation of the vehicle, where the set of telematics data may indicate speed, heading, acceleration data, braking data, turning data, and/or other relevant parameters associated with operation of the vehicle. The electronic device 246 may identify the at least one component based on at least a portion of the set of telematics data (and optionally in combination with the location of the vehicle). For example, if the telematics data indicates that the operator of the vehicle is frequently braking, the electronic device 246 may identify an additional vehicle that is traveling behind the vehicle.

The electronic device 246 may generate (267) the notification that indicates the risk. In particular, the notification may indicate the risk as well as additional information that may be associated with or relevant to the risk. In an implementation, the electronic device 246 may include, in the notification, information indicating at least a portion of the set of telematics data. For example, the notification may indicate a traveling speed of the vehicle. Further, in an implementation, the electronic device may determine, based on the risk, an action for an additional vehicle operator(s) of the additional vehicle(s) 248 to undertake to mitigate the risk. For example, if electronic device 246 determines that the vehicle operator of the vehicle is nodding off, then the notification may indicate for the additional vehicle operator(s) to pull off to the side of the road.

If the at least one component is the additional vehicle(s) 248, the electronic device 246 may transmit (268) the notification to the additional vehicle(s) 248. In embodiments, the electronic device 246 may transmit the notification via one or more networks, such as any type of DSRC. After receiving the notification, the additional vehicle(s) 248 (or device(s) associated therewith) may present (270) the notification for review by one or more individuals, such as via a user interface. For example, an operator of the additional vehicle 248 may use an electronic device to review the notification, identify the risk and any information associated therewith, assess any need or opportunity to adjust driving behavior to mitigate the risk, and/or facilitate other actions.

If the at least one component is the infrastructure component 250, the electronic device 246 may transmit (272) the notification to the infrastructure component 250. In some implementations, if the infrastructure component 250 is configured with a display component (e.g., the infrastructure component 250 is configured with a variable-message sign), the infrastructure component 250 may present (273) the notification such that any individuals may review the notification, identify the risk and any information associated therewith, assess any need or opportunity to adjust driving behavior to mitigate the risk, and/or facilitate other actions.

In an implementation, the infrastructure component 250 may identify one or more of the additional vehicles 248 to which to send the notification. In particular, the infrastructure component 250 may identify the additional vehicle(s) 248 as those that are within a vicinity of the infrastructure component 250 and/or that are predicted to travel (e.g., based on speed, heading, etc.) within a vicinity of the infrastructure component 250. It should be appreciated that the infrastructure component 250 may identify the additional vehicle(s) 248 according to other techniques.

After identifying the additional vehicle(s) 248, the infrastructure component 250 may transmit (274) the notification to the additional vehicle(s) 248 via one or more networks, such as any type of DSRC. After receiving the notification, the additional vehicle(s) 248 (or device(s) associated therewith) may present (276) the notification for review by one or more individuals, such as via a user interface. For example, an operator of the additional vehicle 248 may use an electronic device to review the notification, identify the risk and any information associated therewith, assess any need or opportunity to adjust driving behavior to mitigate the risk, and/or facilitate other actions.

Figure 3B:
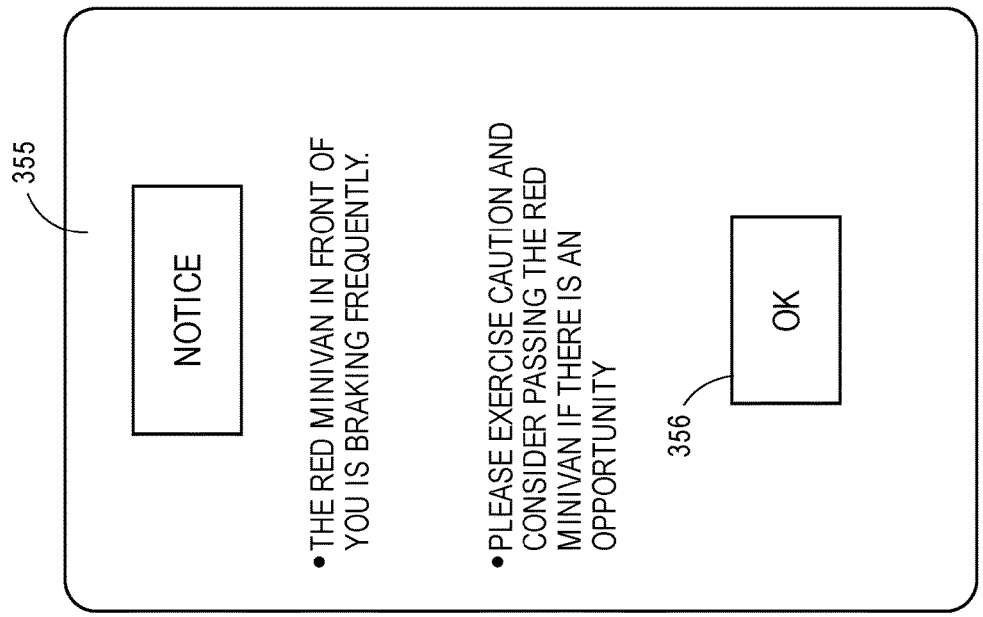
FIGS. 3A and 3B depict user interfaces associated with example notifications, in accordance with some embodiments.
Figure 3A:
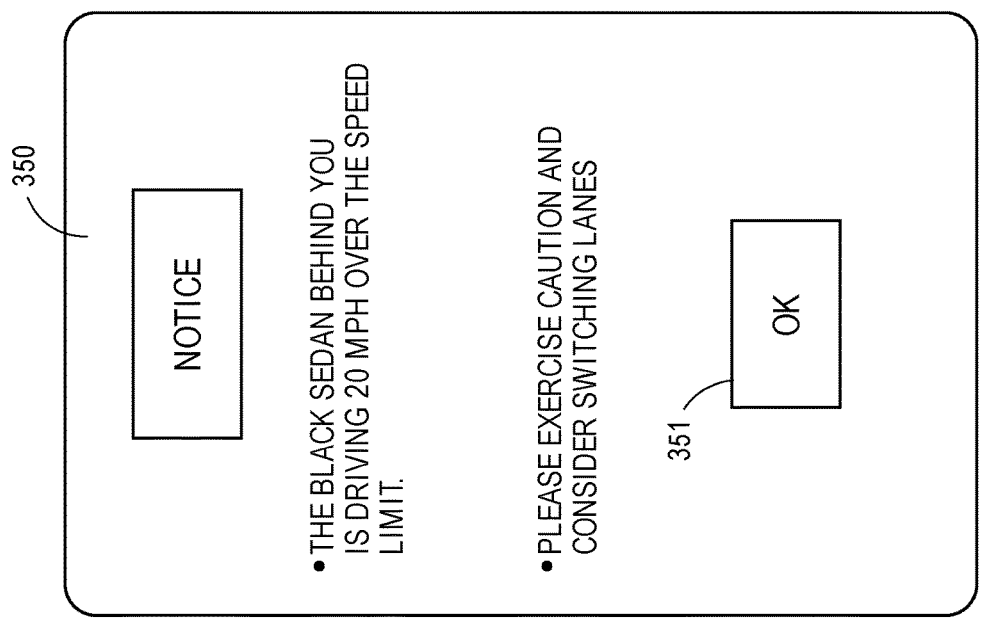

FIGS. 3A and 3B illustrate interfaces including example notifications. An electronic device (e.g., a mobile device, such as a smartphone) may be configured to display the interfaces and/or receive selections and inputs via the interfaces, where the electronic device may be associated with an operator of a vehicle, or may be integrated into the vehicle. For example, a dedicated application that is configured to operate on the electronic device may display the interfaces. Generally, the electronic device may be associated with a vehicle that receives a notification concerning the operation of another vehicle. It should be appreciated that the interfaces are merely examples and that alternative or additional content is envisioned.

FIG. 3A illustrates an interface 350 that includes a notice indicating that a black sedan behind the vehicle is driving twenty (20) mph over the speed limit. The interface 350 further indicates suggestions for the associated vehicle operator, namely to exercise caution and consider switching lanes. The interface 350 includes an okay selection 351 that enables the vehicle operator to dismiss the interface 350.

FIG. 3B illustrates an interface 355 that includes a notice indicating that a red minivan in front of the given vehicle is braking frequently. The interface 355 further indicates suggestions for the associated vehicle operator, namely to exercise caution and consider passing the red minivan if there is an opportunity. The interface 355 includes an okay selection 356 that enables the vehicle operator to dismiss the interface 355.

Figure 4:
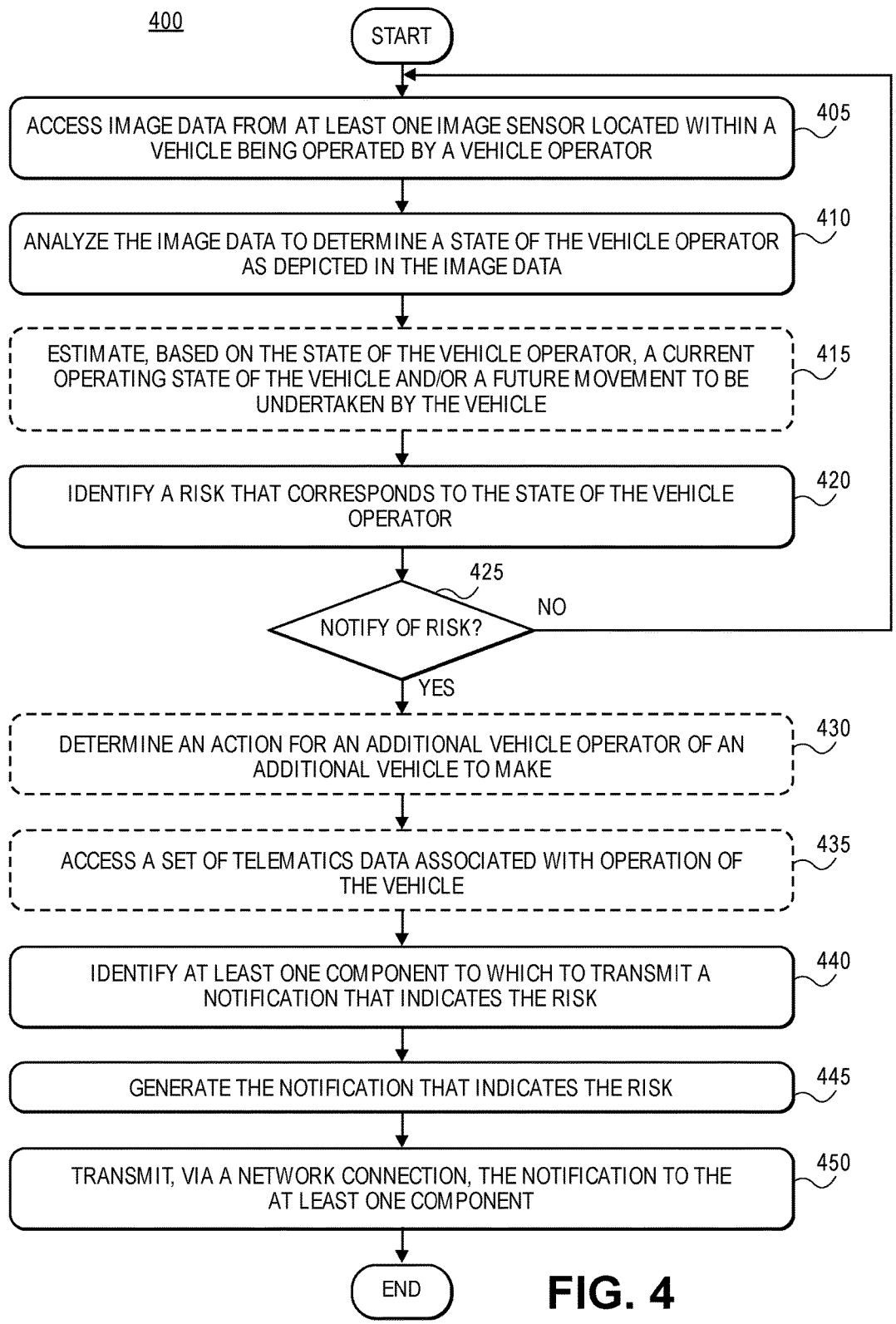
FIG. 4 depicts an exemplary flow diagram associated with managing notifications associated with vehicular transportation, in accordance with some embodiments.

FIG. 4 depicts is a block diagram of an exemplary method 400 of managing notifications associated with vehicular transportation. The method 400 may be facilitated by an electronic device that may be located within a vehicle or incorporated as part of the vehicle. The electronic device may support execution of a dedicated application that may facilitate the functionalities of the method 400. Further, the electronic device may enable a user or individual (e.g., an operator of the vehicle) to make various selections and facilitate various functionalities.

The method 400 may begin when the electronic device accesses (block 405) image data from at least one image sensor located within a vehicle being operated by a vehicle operator. In embodiments, the electronic device may access the image data from an image sensor incorporated within the electronic device or may retrieve the image data from an external image sensor.

The electronic device may analyze (block 410) the image data to determine a state of the vehicle operator as depicted in the image data. In embodiments, the electronic device may determine at least one of a position of the vehicle operator as depicted in the image data, and a movement made by the vehicle operator as depicted in the image data, where the position and/or the movement may be indicative of the state of the vehicle operator. It should be appreciated that various techniques for analyzing the image data are envisioned.

The electronic device may optionally estimate (block 415), based on the state of the vehicle operator, a current operating state of the vehicle and/or a future movement to be undertaken by the vehicle. In embodiments, the current operating state of the vehicle may reflect the vehicle's operation according to the state of the vehicle operator, where the electronic device may estimate the future movement based on the current operating state.

The electronic device may identify (block 420) a risk that corresponds to the state of the vehicle operator. In embodiments, the electronic device may access a lookup table or other data structure to identify the risk that corresponds to the state of the vehicle operator, where the risk may have an associated likelihood of occurrence (i.e., a likelihood that an event associated with the risk occurs). Further, in embodiments, the electronic device may account for the current operating state of the vehicle and/or the estimated future movement in identifying the risk.

The electronic device may determine (block 425) whether to notify of the risk. In embodiments, the electronic device may deem that a risk exists if the likelihood of occurrence of the identified risk at least meets a predetermined threshold. If the risk does not at least meet the predetermined threshold ("NO"), processing may repeat, end, or proceed to other functionality. If the risk does at least meet the predetermined threshold ("YES"), the electronic device may optionally determine (block 430) an action for an additional vehicle operator of an additional vehicle to make to mitigate the risk. In embodiments, the action may be any type of maneuver, movement, or other action for the additional vehicle to make to mitigate the risk posed by the vehicle.

The electronic device may also optionally access (block 435) a set of telematics data associated with operation of the vehicle. In embodiments, the set of telematics data may include various vehicle operation parameters that may be useful for another vehicle operator to assess. The electronic device may identify (block 440) at least one component to which to transmit a notification that indicates the risk. In identifying the at least one component (e.g., an additional vehicle or an infrastructure component), the electronic device may consider at least one of: a location of the vehicle, a location of one or more additional vehicles in a vicinity of the vehicle, a future movement and/or location of the vehicle, and at least a portion of the telematics data.

The electronic device may generate (block 445) the notification that indicates the risk. In embodiments, the content of the notification may be based on the at least one component that is to receive the notification (e.g., an additional vehicle or an infrastructure component). Further, the content of the notification may include an indication of the risk, any determined action for an additional vehicle operator of an additional vehicle to make, at least a portion of the set of telematics data, and/or other information.

The electronic device may transmit (block 450), via a network connection, the notification to the at least one component. In embodiments, the network connection may be any type of network connection, such as a DSRC connection. Further, if the at least one component is an infrastructure component, the infrastructure component may retransmit the notification to an additional vehicle. If the at least one component is an additional vehicle, an operator of the additional vehicle may access and review the notification, and make or complete any action(s) to mitigate the risk posed by the vehicle.

Figure 5:
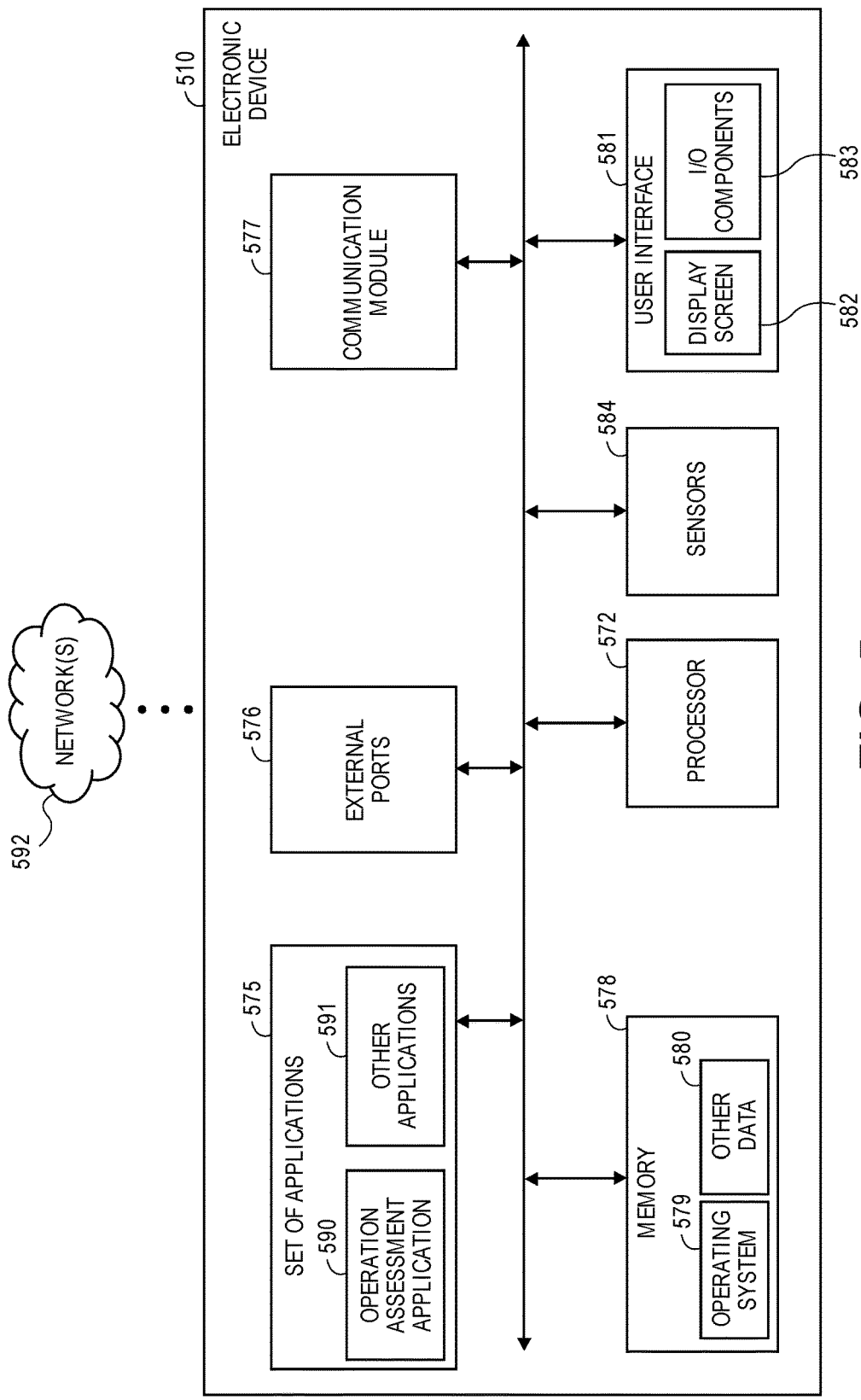
FIG. 5 is a block diagram of an exemplary electronic device, in accordance with some embodiments.

FIG. 5 illustrates a diagram of an exemplary mobile or other electronic device 510 (such as one of the electronic devices 110, 115, 151, 156, 161 as discussed with respect to FIGS. 1A-1C) in which the functionalities as discussed herein may be implemented. It should be appreciated that the electronic device 510 may be configured to be transported in a vehicle and/or connect to an on-board telematics platform of the vehicle, as discussed herein. Further, it should be appreciated that the electronic device 510 may be integrated into an on-board system of the vehicle.

The electronic device 510 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be an operation assessment application 590 configured to analyze image data, identify risks, and facilitate notification communication. It should be appreciated that one or more other applications 591 are envisioned.

The processor 572 may interface with the memory 578 to execute the operating system 579 and the set of applications 575. According to some embodiments, the memory 578 may also include other data 580 that may include any data (e.g., image profile data, telematics data, location data, etc.) related to facilitating the functionalities as discussed herein. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 510 may further include a communication module 577 configured to communicate data via one or more networks 592. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. Further, the communication module 577 may include a short-range network component (e.g., an RFID reader) configured for short-range network communications. For example, the communication module 577 may receive, via the network 592, image data from a set of image sensors. For further example, the communication module 577 may transmit, via the network 592, notifications to nearby vehicle devices and/or RSE components.

The electronic device 510 may further include a set of sensors 584. The processor 572 and the set of applications 575 may interface with the set of sensors 584 to retrieve and process the corresponding sensor data. The set of sensors 584 may include, for example, a location module, an accelerometer, a gyroscope, one or more image sensors, and/or the like. In one particular implementation, the operation assessment application 590 may use various data from the set of sensors 584 to facilitate certain functionalities.

The electronic device 510 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the electronic device 510 via the user interface 581 to review information and/or perform other functions. In some embodiments, the electronic device 510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 572 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method in an electronic device of managing notifications associated with vehicular transportation, the method comprising:
   accessing image data from at least one image sensor located within a vehicle being operated by a vehicle operator;
   analyzing, by a computer processor, the image data to determine a state of the vehicle operator as depicted in the image data;
   determining, based on the state of the vehicle operator, that a risk exists;
   identifying a current location of the vehicle;
   determining, based on the current location of the vehicle, a future location of the vehicle;
   determining, based on the future location of the vehicle, a component to which to transmit a notification that indicates the risk, wherein a location of the component is within a vicinity of the future location of the vehicle;
   determining, based on the risk, an action for an additional vehicle operator of an additional vehicle to undertake to mitigate the risk;
   generating the notification that indicates (i) the risk, and (ii) the action for the additional vehicle operator to undertake to mitigate the risk; and
   transmitting, via a network connection, the notification to the component.

2. The computer-implemented method claim 1, wherein determining the component comprises:
   determining one of: (i) the additional vehicle or (ii) an infrastructure component.

3. The computer-implemented method of claim 1, wherein determining the component is further based on the current location of the vehicle.

4. The computer-implemented method of claim 1, wherein analyzing the image data to determine the state of the vehicle operator as depicted in the image data comprises:
   analyzing the image data to determine at least one of: (i) a positioning of the vehicle operator as depicted in the image data, and (ii) a movement made by the vehicle operator as depicted in the image data.

5. The computer-implemented method of claim 1, further comprising:
   accessing a set of telematics data associated with operation of the vehicle; and
   transmitting, via the network connection, at least a portion of the set of telematics data to the component.

6. The computer-implemented method of claim 1, wherein determining, based on the state of the vehicle operator, that the risk exists comprises:
   estimating, based on the state of the vehicle operator, a future movement to be undertaken by the vehicle; and
   determining, based on the future movement, that the risk exists.

7. The computer-implemented method of claim 1, wherein determining the action comprises:
   determining, based on the risk and the future movement to be undertaken by the vehicle, the action for the additional vehicle operator of the additional vehicle to undertake to mitigate the risk.

8. The computer-implemented method of claim 1, wherein determining, based on the state of the vehicle operator, that the risk exists comprises:
   estimating, based on the state of the vehicle operator, a current operating state of the vehicle;
   estimating, based on the current operating state of the vehicle operator, a future movement to be undertaken by the vehicle; and
   determining, based on the future movement, that the risk exists.

9. The computer-implemented method of claim 1, wherein determining, based on the state of the vehicle operator, that the risk exists comprises:
   identifying the risk that corresponds to the state of the vehicle operator, the risk having a likelihood of occurrence; and
   determining that the likelihood of occurrence of the risk at least meets a threshold value.

10. A system for managing notifications associated with vehicular transportation, comprising:
    a transceiver configured to communicate via a network connection;
    a memory configured to store non-transitory computer executable instructions; and
    a processor configured to interface with the memory, wherein the processor is configured to execute the non-transitory computer executable instructions to cause the processor to:
      access image data from at least one image sensor located within a vehicle being operated by a vehicle operator,
      analyze the image data to determine a state of the vehicle operator as depicted in the image data,
      determine, based on the state of the vehicle operator, that a risk exists,
      identify a current location of the vehicle,
      determine, based on the current location of the vehicle, a future location of the vehicle,
      determine, based on the future location of the vehicle, a component to which to transmit a notification that indicates the risk, wherein a location of the component is within a vicinity of the future location of the vehicle,
      determine, based on the risk, an action for an additional vehicle operator of an additional vehicle to undertake to mitigate the risk,
      generate the notification that indicates (i) the risk, and (ii) the action for the additional vehicle operator to undertake to mitigate the risk, and
      transmit, via the transceiver, the notification to the component.

11. The system of claim 10, wherein the component is one of: (i) the additional vehicle or (ii) an infrastructure component.

12. The system of claim 10, wherein the processor determines the component further based on the current location of the vehicle.

13. The system of claim 10, wherein to analyze the image data to determine the state of the vehicle operator as depicted in the image data, the processor is configured to:
    analyze the image data to determine at least one of: (i) a positioning of the vehicle operator as depicted in the image data, and (ii) a movement made by the vehicle operator as depicted in the image data.

14. The system of claim 10, wherein the processor is further configured to:
   access a set of telematics data associated with operation of the vehicle, and
   transmit, via the transceiver, at least a portion of the set of telematics data to the component.

15. The system of claim 10, wherein to determine, based on the state of the vehicle operator, that the risk exists, the processor is configured to:
   estimate, based on the state of the vehicle operator, a future movement to be undertaken by the vehicle, and
   determine, based on the future movement, that the risk exists.

16. The system of claim 15, wherein to determine the action, the processor is configured to:
   determine, based on the risk and the future movement to be undertaken by the vehicle, the action for the additional vehicle operator of the additional vehicle to undertake to mitigate the risk.

17. The system of claim 10, wherein to determine, based on the state of the vehicle operator, that the risk exists, the processor is configured to:
   estimate, based on the state of the vehicle operator, a current operating state of the vehicle,
   estimate, based on the current operating state of the vehicle operator, a future movement to be undertaken by the vehicle, and
   determine, based on the future movement, that the risk exists.

18. The system of claim 10, wherein to determine, based on the state of the vehicle operator, that the risk exists, the processor is configured to:
   identify the risk that corresponds to the state of the vehicle operator, the risk having a likelihood of occurrence, and
   determine that the likelihood of occurrence of the risk at least meets a threshold value.

* * * * *